(12) United States Patent
Parkinson

(10) Patent No.: US 6,990,460 B2
(45) Date of Patent: Jan. 24, 2006

(54) DYNAMIC DEMAND MANAGEMENT

(75) Inventor: Thomas L. Parkinson, Winnetka, IL (US)

(73) Assignee: Peapod, Inc., Skokie, IL (US)

( * ) Notice: Subject to any disclaimer, the term of this patent is extended or adjusted under 35 U.S.C. 154(b) by 818 days.

(21) Appl. No.: 09/833,123

(22) Filed: Apr. 11, 2001

(65) Prior Publication Data

US 2002/0049632 A1 Apr. 25, 2002

Related U.S. Application Data

(60) Provisional application No. 60/241,626, filed on Oct. 19, 2000.

(51) Int. Cl.
*G06F 17/60* (2006.01)

(52) U.S. Cl. .............................. 705/10; 705/14; 705/26; 705/27

(58) Field of Classification Search .................. 705/10, 705/14, 26, 27
See application file for complete search history.

(56) References Cited

U.S. PATENT DOCUMENTS 6,049,778 A * 4/2000 Walker et al. ................ 705/14
6,119,100 A * 9/2000 Walker et al. ................ 705/20
6,631,413 B1 * 10/2003 Aggarwal et al. .......... 709/226

FOREIGN PATENT DOCUMENTS

GB 2259168 A * 3/1993

OTHER PUBLICATIONS

Richard H. Levey, P(1)ush E–mail, May 15, 2000, Direct, v12, n7, p48.*

* cited by examiner

Primary Examiner—Raquel Alvarez
(74) Attorney, Agent, or Firm—Brian T. Sattiahn; McNees Wallace & Nurick LLC

(57) ABSTRACT

A system, method, and apparatus for allocating demand for a number of time periods is presented herein. The business volume is monitored during each time period, and wherein the business volume is found to lag or exceed certain thresholds, incentives or surcharges are imposed, respectively. Wherein an incentive is offered during a time period, the business volume during the time period is monitored and wherein the business volume exceeds a certain threshold, the incentive is withdrawn. Wherein a surcharged is imposed during a time period, the business volume during the time period is monitored and wherein the business volume drops to a certain threshold, the surcharge is withdrawn.

20 Claims, 4 Drawing Sheets

DYNAMIC DEMAND MANAGEMENT

CLAIM OF PRIORITY

The present application for patent claims the benefit of U.S. Provisional Application for Patent Ser. No. 60/241,626, "Real Time Demand Management through the use of Incentives", filed Oct. 19, 2000 by Thomas Parkinson, and which is hereby incorporated by reference for all purposes.

FIELD

The present invention is related to e-commerce and more particularly, to a real-time demand allocation system.

BACKGROUND

Proper allocation of demand results in improved efficiency and higher profits. The volume of many businesses are often affected by time periods, wherein large volumes of business are conducted during one time period, known as a peak-time, while smaller volumes of business are conducted during other time periods, off-peak time. For example, a grocery store usually enjoys the highest volume of business between 5–8 pm on weekdays, and the weekend. However, other time periods are usually marked with very little business.

The foregoing fluctuations in business volume are often accommodated by the commitment of fewer resources during the off-peak times. For example, the grocery store may employ a smaller staff during the off-peak hours. Alternatively, the business can increase volume by reduction of prices, thereby increasing demand during off-peak hours. Examples of the foregoing include, happy hours, red-eye flights, off-peak transit fares, and matinee shows, to name a few.

The foregoing price reductions are planned and marketed prior to the off-peak times. The determination of the off-peak time as well as the amount of the price reduction are based on estimated future volumes of business. The estimate of future volume often relies on past data during similar time periods, as well as analyzed trends. However, such estimates do not always accurately reflect actual business volume. Accordingly, the inaccurate estimation of business volume can either cause loss of business, or excessive costs.

Additionally, the impact of price reductions must also be determined. For example, a business may accurately predict a volume downturn during a particular period and decide to reduce prices to increase the volume. However, the business must also estimate the additional volume brought on due to the price reduction. Inaccurate estimation of the change in business volume may also result in excessive costs, or in lost profits.

Inaccuracies in estimations can occur for a number of reasons. Variations can occur due to new trends which are not easily detected. Additionally, statistical variances are common in the use of past samples to determine the outcome of future activity. Therefore, absolute accuracy in the estimation of future business volume is not always possible.

Accordingly, it would be advantageous if business volume could be allocated on real-time basis.

SUMMARY

Disclosed herein is a way for managing customer demand through the use of incentives. Incentives, such as coupons or discounts, are offered on a real-time basis to customers who are willing to select product service options that are associated with lower business volume. After offering the incentives, the business volume associated with the product service option is observed. Wherein the volume exceeds a predetermined threshold, the incentive is withdrawn and the subsequent customers selecting the product service option are not offered the incentive.

BRIEF DESCRIPTION

DETAILED DESCRIPTION

Figure 1:
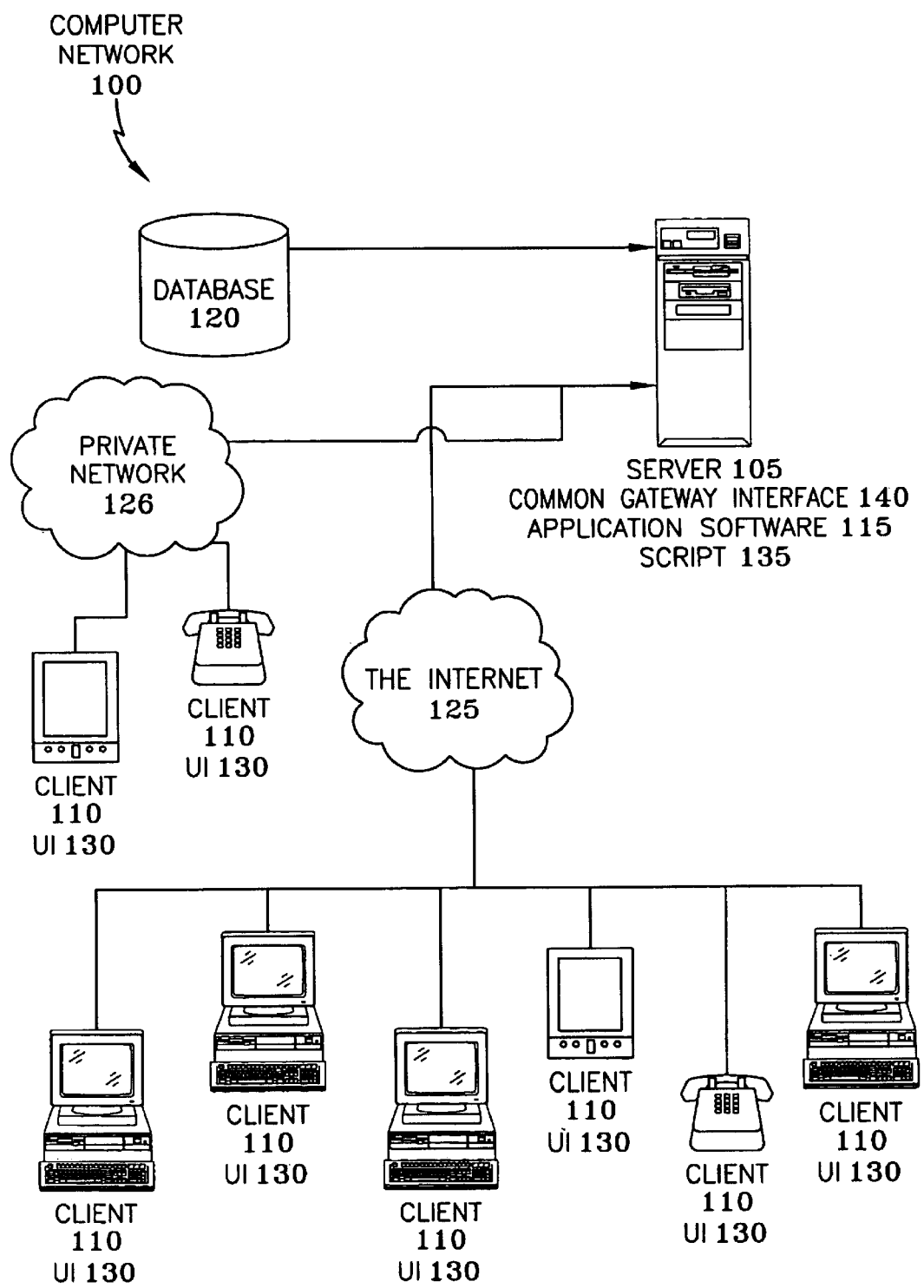
FIG. 1 is a block diagram of a computer network.

Referring now to FIG. 1, there is illustrated a block diagram of a computer network, referenced generally by the numeral designation 100 for buying and selling goods and services. The computer network 100 comprises at least one server 105 and any number of client computers 110. A server 105 is a computer which centralizes various resources for usage by any number of client computers 110. The resources centralized by the server 105 can include for example, application programs 115 and databases 120.

The client computers 110 access the centralized resources by establishing an input/output connection with the server 105, known as a client/server connection. The client/server connection is established by means of a communication channel 125. The communication channel 125 includes any combination of communication media, such as, but not limited to, a coaxial cable, a fiber optic link, a wireless radio link, or a connection within the public switched telephone network. Another type of communication media is known as the Internet. The Internet comprises any number of local area networks (LANs) and wide area networks (WANs), from corporations, educational institutions, the military, and government agencies from around the world, connected together by means of high capacity data links.

In many cases, the client computer 110 and the server 105 are both directly connected to the Internet. The client computer 110 and server 105 communicate by addressing and sending data packets in accordance with the protocols of the Internet, thereby establishing client/server connections. Alternatively, the client computer 110 can establish a connection using connection media (usually a connection within the public switched telephone network) with an internet port known as an internet service provider (ISP) and then use the internet to establish a connection from the ISP to the client computer 110.

The foregoing input/output connection is used to provide inputs to the server 105 from the client computer 110 and outputs to the client computer 110 from the server 105. The transfer of inputs and outputs is facilitated by use of a graphical user interface (GUI) 130 at the client 110. The GUI 130 includes a number of objects which are defined by a script program 135 at the server 105. The objects receive input from the client terminal 110 and display outputs. A common gateway interface (CGI) 140 receives the inputs from the GUI 130 and provides the inputs to the application program. Additionally, the outputs from the application program are received by the CGI 140 and forwarded to the GUI 130.

It is noted that computers, such as the server 105 and client computers 110 execute low level machine specific instructions known as machine code. With the world-wide reach of the internet, problems of incompatibility between the script program and the server 105 and the client computer 110 arise. To alleviate the foregoing problem, a program known as a browser 120 is used at the client computer 110. The browser 120 is a program which executes programs, such as the script program, written in a high-level programming language, such as Java (registered trademark), which is universally enabled by browsers.

The foregoing computer network 100 can be used to sell products or services from a seller associated with the server to a customer associated with the client computer. The GUI can be used to display information describing the seller's goods and/or services and receive sales orders from the customers. In an exemplary case, the server 105 can be associated with a home grocery delivery system. The customer can select groceries and a particular delivery time.

Figure 2:
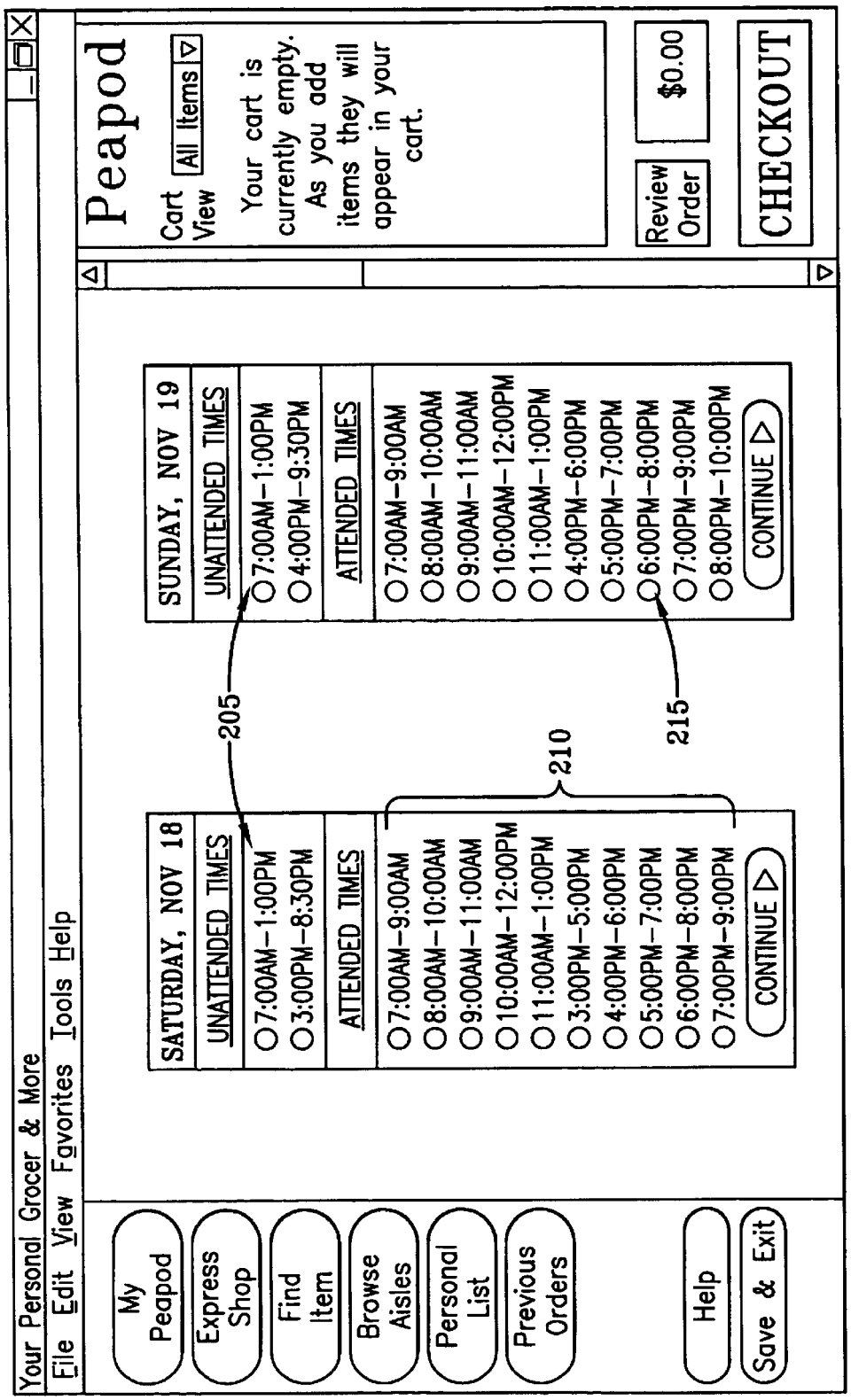
FIG. 2 is a block diagram of a graphical user interface.

Referring now to FIG. 2, there is illustrated a block diagram of an exemplary GUI 130 for selecting a delivery time for delivery of a predetermined list of groceries. The GUI 130 includes a list 205 of a plurality of delivery times 210, wherein each of the delivery times is associated with a particular radio button 215. The user can selected a particular delivery time by selecting a radio button 215 associated therewith.

The markets serviced by the internet home grocery delivery system are divided into any number of geographic customer areas. When a customer places an order for delivery, the particular geographic customer area is determined based on the location of the delivery address. The foregoing can be determined in a number of different ways. For example, the geographic customer area can be determined based on the zip code of the delivery address.

In the foregoing manner, the internet home grocery delivery system can divide markets by both time and location. However, inefficiencies can occur based on disproportionate or unexpected levels of demand in certain geographic customer areas and times. For example, the number of delivery orders can unexpectedly exceed the delivery capacity during one particular time, and which can be unexpectedly low during another particular time. It is preferable to shift the delivery orders during the time of high demand to the period of time with low demand.

To achieve the foregoing, the present invention proposes management of customer demand through the use of incentives or imposition of surcharges. Consumers are often flexible on their optimal/product service and willing to select other options if offered incentives or imposed surcharges then the customer would normally be predisposed to do. Therefore, the demand during slots for delivery for each geographic customer area can be managed wherein demand is diverted from slots with a high number of delivery orders, or which are otherwise less desirous, to a slot with a low number of delivery orders by offering incentives or imposing surcharges.

The delivery slots for each geographic customer area can be monitored for the number of orders on a real-time basis. Wherein the number of delivery orders for a delivery slot is found to lag behind other delivery slots, the internet home grocery delivery system can dynamically offer an incentive, such as a discount, for customers willing to accept delivery during the slot. The incentive can include, for example, a discount, a charitable contribution, an environmental appeal, or frequent flyer discount. Alternatively, a surcharge can be imposed for delivery orders associated with slots which are found to have a high number of orders or are otherwise less desirous for the merchant. Upon offering the discount, the delivery orders continue to be monitored, and wherein the delivery orders increase to a predetermined level, the incentive or surcharge is removed and subsequent customers placing orders for delivery during the slot are not offered the discount or imposed the surcharge.

Figure 3:
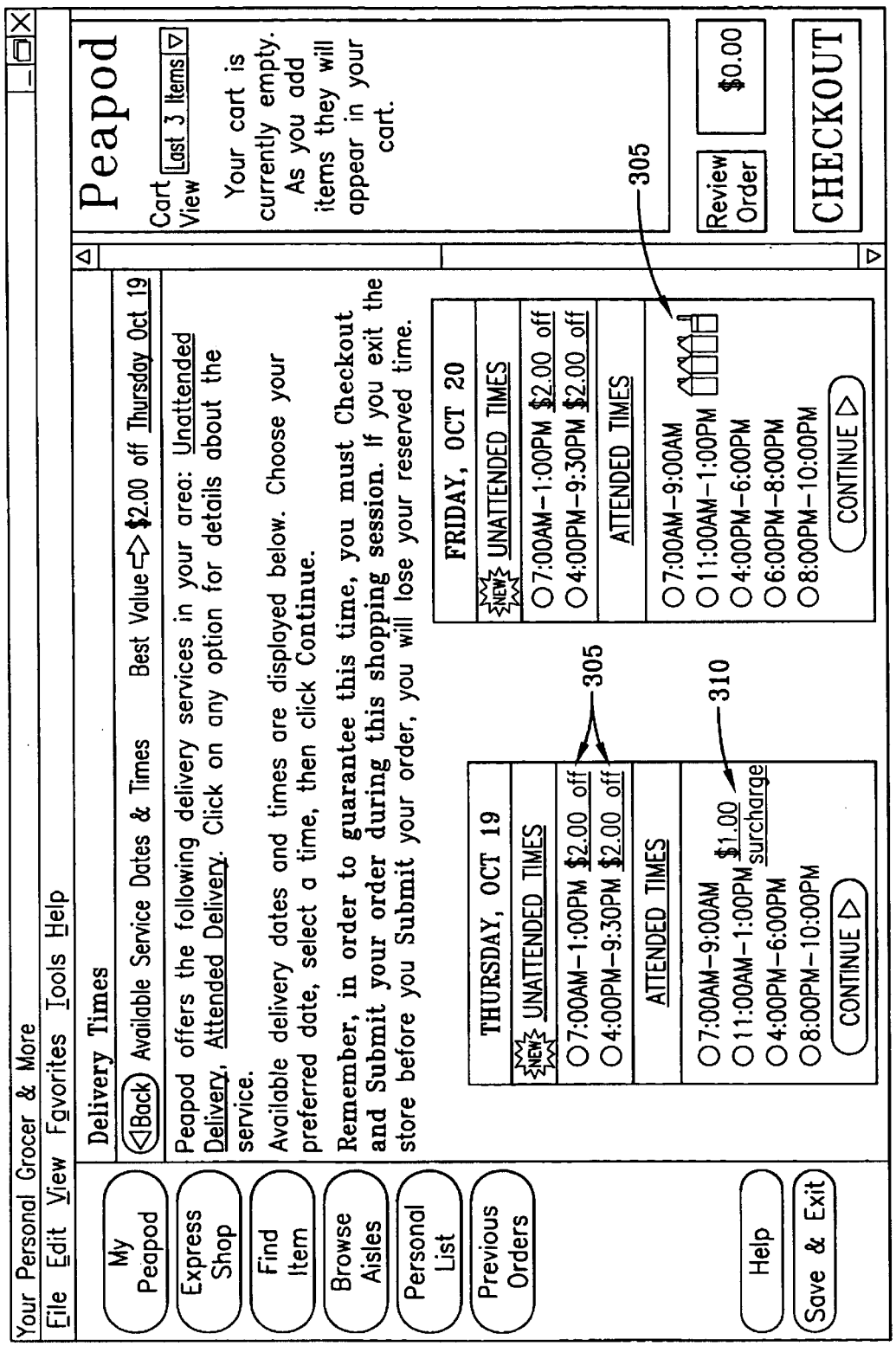
FIG. 3 is a block diagram of a graphical user interface wherein surcharges are imposed and incentives offered.

Referring now to FIG. 3, there is illustrated a block diagram of the GUI 130 of FIG. 2, incentives and surcharges are applied. Wherein a deliver slot is found to lag, an incentive indicator 305 is associated with the delivery slot. Any customer who selects the delivery slot associated therewith is offered the indicated incentive 305. The volume is monitored during the foregoing delivery slot and wherein the volume is found to exceed a certain threshold, the incentive indicator 305 is removed and further customers selecting the associated delivery slot are not offered the incentive.

Wherein a deliver slot is found to have received a volume of order exceeding a predetermined threshold, a surcharge indicator 310 is associated with the delivery slot. Any customer who selects the delivery slot associated therewith is charged the indicated surcharge 310. The volume is monitored during the foregoing delivery slot and wherein the volume is found to be less than a certain threshold, the surcharge indicator 310 is removed and further customers selecting the associated delivery slot are not charged the surcharge.

Figure 4:
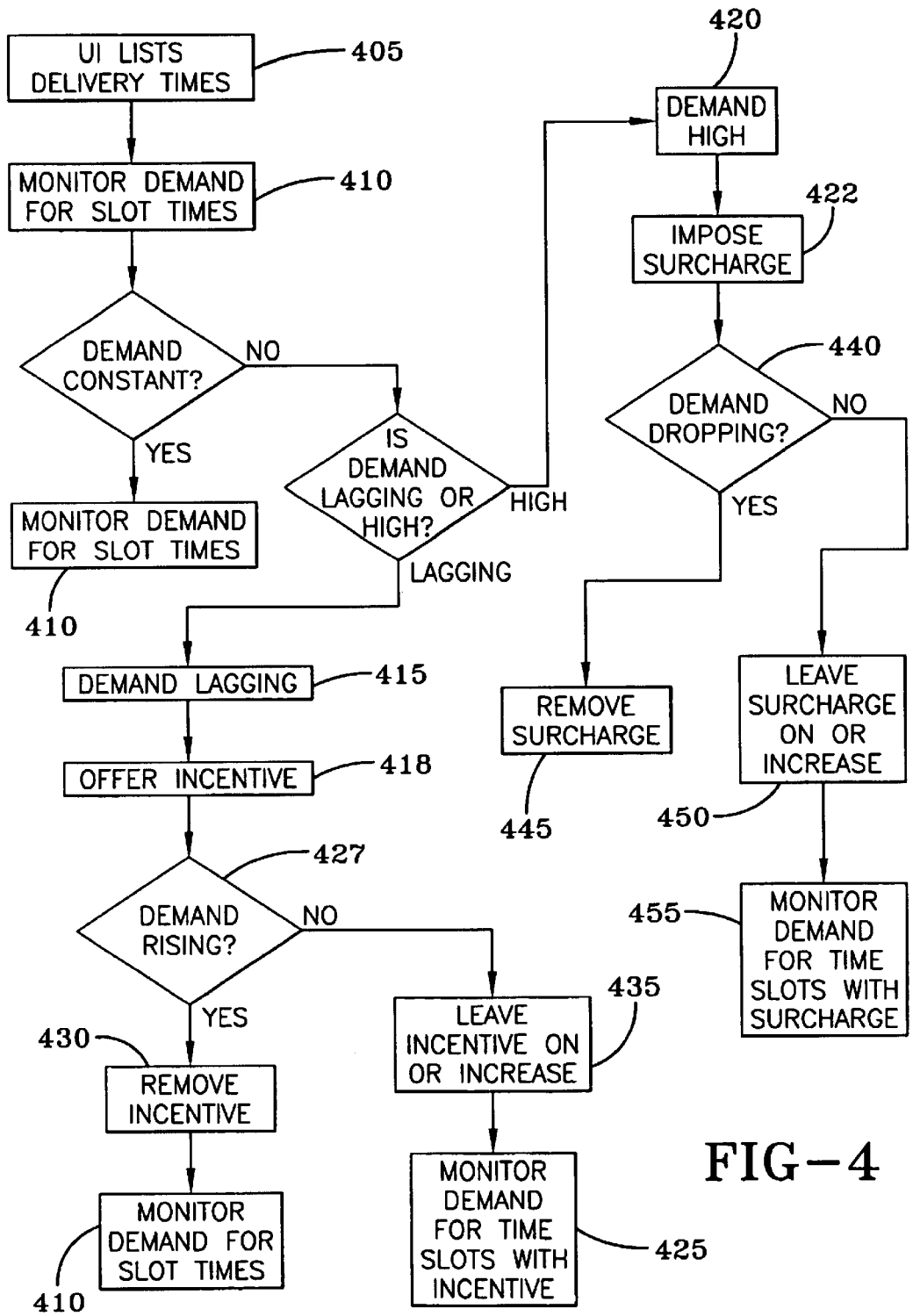
FIG. 4 is a flow diagram describing the demand allocation.

Referring now to FIG. 4, there is illustrated a flow diagram describing the operation of the computer network and GUI. At step 405, a GUI is provided which lists a plurality of delivery times, each one of which associated with a particular selection indicator, such as the radio buttons. The demand volume for each of the listed delivery times is monitored during step 410.

Wherein the delivery orders for a particular time slot lag (during step 415), an incentive is associated with the particular time slot. Wherein the delivery orders for a particular time slot exceeds a certain threshold (during step 420), a surcharge is associated with the time slot. The demand during slots associated with an incentive are monitored during step 425 and wherein the demand is found to have risen to a predetermined level, the incentive is removed (step 430) and further orders are not offered the incentive. During step 435, the demand during delivery slots associated with surcharges is monitored and wherein the demand has dropped to a predetermined level, the surcharge is removed and no longer imposed (step 440).

Those skilled in the art will recognized that in an exemplary embodiment, the foregoing steps of FIG. 3 can be implemented as a plurality of executable instructions stored in computer readable memory and executed by a computer system, e.g., server 105. The computer readable memory can comprise random access memory (RAM), read only memory (ROM), hard disk memory, or portable memory, such as a floppy disk, compact disk (CD-ROM), or a digital versatile disk (DVD).

Although preferred embodiments of the present inventions have been illustrated in the accompanying drawings and described in the foregoing Detail Description, it will be understood that the inventions are not limited to the embodiments disclosed, but are capable of numerous rearrangements, modifications, and substitutions without departing from the spirit of the invention as set forth and defined by the following claims and equivalents thereof.

What is claimed is:

1. A method for allocating demand for delivery services associated with computer network based customer orders, said method comprising the steps of:

receiving a customer order over a computer network, the customer order including a time period selected from a plurality of time periods for delivery of the customer order;

monitoring demand for deliveries of customer orders in each time period of the plurality of time periods with a computer server;

determining at least one time period of the plurality of time periods having a lower level of demand than other time periods of the plurality of time periods;

offering an incentive to customers placing an order over the computer network and selecting the determined at least one time period of the plurality of time periods; and withdrawing the offered incentive in response to receipt of a predetermined number of customer orders selecting the determined at least one time period exceeding a predetermined threshold.

2. The method of claim 1, wherein the incentive is a price discount.

3. The method of claim 1 further comprising the steps of:
determining at least one second time period of the plurality of time periods having a higher level of demand than other time periods of the plurality of time periods;
imposing a surcharge to customers placing an order over the computer network and selecting the determined at least one second time period of the plurality of time periods; and
withdrawing the imposed surcharge in response to receipt of a predetermined number of customer orders selecting the determined at least second one time period being less than a second predetermined threshold.

4. The method of claim 3 wherein the imposed surcharge is a price increase.

5. The method of claim 1 wherein the step of monitoring demand for deliveries of customer orders includes calculating a number of customer orders for each time period of the plurality of time periods.

6. The method of claim 1 further comprising the step of determining a geographic customer area for a customer based on a delivery address associated with a customer order.

7. A method for allocating demand for delivery services associated with computer network based customer orders, said method comprising the steps of:
receiving a customer order over a computer network, the customer order including a time period selected from a plurality of time periods for delivery of the customer order;
monitoring demand for deliveries of customer orders in each time period of the plurality of time periods with a computer server;
determining at least one time period of the plurality of time periods having a greater level of demand than other time periods of the plurality of time periods;
imposing a surcharge to customers placing an order over the computer network and selecting the determined at least one time period of the plurality of time periods; and
withdrawing the imposed surcharge in response to receipt of a predetermined number of customer orders selecting the determined at least one time period being less than a predetermined threshold.

8. The method of claim 7 wherein the imposed surcharge is a price increase.

9. The method of claim 7 further comprising the steps of:
determining at least one second time period of the plurality of time periods having a lower level of demand than other time periods of the plurality of time periods;
offering an incentive to customers placing an order over the computer network and selecting the determined at least one second time period of the plurality of time periods; and
withdrawing the offered incentive in response to receipt of a predetermined number of customer orders selecting the determined at least one time period exceeding a predetermined threshold.

10. The method of claim 9 wherein the offered incentive is a price discount.

11. The method of claim 7 wherein the stop of monitoring demand for deliveries of customer orders includes calculating a number of customer orders for each time period of the plurality of time periods.

12. The method of claim 7 further comprising the step of determining a geographic customer area for a customer based on a delivery address associated wit a customer order.

13. A computer program product embodied on a computer readable medium and executable by a microprocessor for allocating demand for delivery services associated with computer network based customer orders, said computer program product comprising a plurality of executable instructions for executing the steps of:
receiving a customer order over a computer network, the customer order including a time period selected from a plurality of time periods for delivery of the customer order;
monitoring demand for deliveries of customer orders in each time period of the plurality of time periods;
determining at least one time period of the plurality of time periods having a lower level of demand than other time periods of the plurality of time periods;
offering an incentive to customers placing an order over the computer network and selecting the determined at least one time period of the plurality of time periods; and
withdrawing the offered incentive in response to receipt of a predetermined number of customer orders selecting the determined at least one time period exceeding a predetermined threshold.

14. The article of manufacture of claim 13, wherein the incentive is a price discount.

15. The computer program product of claim 13 further comprising executable instructions for executing the steps of:
determining at least one second time period of the plurality of time periods having a higher level of demand than other time periods of the plurality of time periods;
imposing a surcharge to customers placing an order over the computer network and selecting the determined at least one second time period of the plurality of time periods; and
withdrawing the imposed surcharge in response to receipt of a predetermined number of customer orders selecting the determined at least second one time period being less than a second predetermined threshold.

16. The computer program product of claim 13 wherein the step of monitoring demand for deliveries of customer orders includes calculating a number of customer orders for each time period of the plurality of time periods.

17. The computer program product of claim 13 further comprising executable instructions for executing the step of determining a geographic customer area for a customer based on a delivery address associated with a customer order.

18. A system for allocating demand for delivery services associated with sales orders, said system comprising:

at least one client computer, the at least one client computer including a browser configured to display information on goods and operable to submit sales orders for goods from customers, the sales order including a time period selected from a plurality of time periods for delivery of the sales order;

a server computer connected to the at least one client computer by a computer network, the server computer being configured to receive sales orders from the at least one client computer, the server computer comprising:

a microprocessor;

computer instructions executable by the microprocessor for monitoring demand for deliveries of sales orders in each time period of the plurality of time periods;

computer instructions executable by the microprocessor for determining at least one time period of the plurality of time periods having a greater level of demand than other time periods of the plurality of time periods;

computer instructions executable by the microprocessor for displaying a surcharge on the browser and imposing the surcharge to customers placing an order selecting the determined at least one time period of the plurality of time periods; and computer instructions executable by the microprocessor for removing the surcharge displayed by the browser and withdrawing the imposed surcharge in response to receipt of a predetermined number of sales orders selecting the determined at least one time period being less than a predetermined threshold.

19. The system of claim 18 wherein the server computer further comprises:

computer instructions executable by the microprocessor for determining at least one second time period of the plurality of time periods having a lower level of demand than other time periods of the plurality of time periods;

computer instructions executable by the microprocessor for displaying an incentive on the browser and offering the incentive to customers placing an order over the computer network and selecting the determined at least one second time period of the plurality of time periods; and computer instructions executable by the microprocessor for removing the incentive displayed by the browser and withdrawing the offered incentive in response to receipt of a predetermined number of sales orders selecting the determined at least one time period exceeding a predetermined threshold.

20. The system of claim 18 wherein the computer instructions executable by the microprocessor for monitoring demand for deliveries of customer orders includes computer instructions executable by the microprocessor for calculating a number of sales orders for each time period of the plurality of time periods.

* * * * *